United States Patent [19]
Staerzl

[11] Patent Number: 5,936,396
[45] Date of Patent: Aug. 10, 1999

[54] TACHOMETER INTERFACE CIRCUIT WITH ACTIVATED SWITCHING

[75] Inventor: Richard E. Staerzl, Fond du Lac, Wis.

[73] Assignee: Brunswick Corporation, Lake Forest, Ill.

[21] Appl. No.: 08/866,191

[22] Filed: May 30, 1997

[51] Int. Cl.[6] ................................. G01P 3/54; G01P 3/48
[52] U.S. Cl. .......................... 324/166; 324/169; 327/100
[58] Field of Search .................................... 324/166, 168, 324/169, 170, 402; 327/100, 101, 113, 124, 172, 178

[56] References Cited

U.S. PATENT DOCUMENTS

| | | | |
|---|---|---|---|
| 3,643,159 | 2/1972 | Seki et al. | 324/169 |
| 4,950,983 | 8/1990 | Kruncos | 324/169 |

*Primary Examiner*—Walter E. Snow
*Attorney, Agent, or Firm*—Andrus, Sceales, Starke & Sawall

[57] ABSTRACT

A tachometer interface circuit is provided for use with a multi-functional measuring device. The tachometer interface circuit includes a conditioning circuit which receives a series of ignition pulses from an internal combustion engine. The conditioning circuit converts the series of ignition pulses into a series of output pulses each having a constant pulse width. The tachometer interface circuit further includes a magnitude sensing circuit and an offset circuit. The magnitude sensing circuit senses the magnitude of the ignition pulses and activates the offset circuit when the magnitude exceeds a predetermined limit. Upon activation, the offset circuit inserts a resistor into the conditioning circuit to reduce the magnitude of the ignition pulses entering the conditioning circuit. In this manner, the tachometer interface circuit of the present invention is able to operate with ignition pulses having a variety of magnitudes.

12 Claims, 5 Drawing Sheets

TACHOMETER INTERFACE CIRCUIT WITH ACTIVATED SWITCHING

BACKGROUND OF THE INVENTION

The invention relates to a measuring device that can be connected to an internal combustion engine and function as a tachometer to determine engine speed. More specifically, the invention is an interface circuit that is positioned between the measuring device and the internal combustion engine such that the ignition pulses from the internal combustion engine are conditioned and can be measured by the measuring device.

In the field of internal combustion engines, a hand-held, multi-functional measuring device is often used to determine various operating parameters throughout the engine. The hand-held measuring device includes a pair of lead wires that can be attached to various points in the engine at which the operating characteristics of the engine need to be determined. Typically, the hand-held measuring device includes a selection dial that allows a technician to select which kind of measurement is to be made by the measuring device. For example, the measuring device could include settings to measure resistance, voltage, current and other operating conditions, such as the engine speed. When the measuring device is acting as tachometer to measure engine speed, the leads from the measuring device are applied to the ignition system of the internal combustion engine, and the device measures the frequency of the ignition pulses.

The tachometer function of commonly available multi-functional measuring devices is configured to be used on an automotive internal combustion engine. Typically, the ignition system in an automotive engine is an inductive ignition system. Thus, the measuring device is internally configured to measure signals from an inductive ignition system. When the measuring device is properly connected to the engine, the measuring device receives the series of ignition pulses from the internal combustion engine and displays the engine speed on a display panel.

While this type of widely available measuring device is constructed to be used with automotive internal combustion engines, it is also desirable to use the multi-functional measuring device in the marine industry, since similar engine characteristics are important when working on a marine engine. However, marine engines are constructed somewhat differently than their automotive counterparts, and thus behave differently. For example, some marine engines include capacitive discharge ignition systems that produce ignition pulses that are different from those produced by an inductive ignition system found in the automotive industry. When the multi-functional device is connected to an inductive ignition system, the multifunctional measuring device is unable to make an accurate and dependable engine speed measurement. Additionally, the ignition pulses in a marine engine include a larger noise component that makes measurement of the ignition pulses more difficult when compared to an automotive engine.

Since multi-functional measuring devices are currently available and are mass produced, the price of the measuring device is relatively inexpensive. However, since the measuring device oftentimes cannot accurately determine engine speed for many marine engines, it has been found to be unusable for many applications.

Therefore, a tachometer interface circuit that can be used to condition the ignition pulses from a variety of marine internal combustion engines such that the ignition pulses can be read by the standard multi-functional measuring device would be particularly desirable in the marine propulsion industry. Specifically, a tachometer interface circuit that can be inserted between the measuring device and the leads which are attached to the internal combustion engine would be particularly desirable.

BRIEF SUMMARY OF THE INVENTION

A the invention is a tachometer interface circuit for use with a multi-functional measuring device that allows the measuring device to be used with the variety of internal combustion engines used in marine propulsion systems.

The tachometer interface circuit of the present invention includes a conditioning circuit that receives a series of ignition pulses from the internal combustion engine and conditions the pulses into a series of output pulses each having a constant pulse width. The output pulses have the same frequency as the ignition pulses, such that the measuring device can determine the engine speed.

The tachometer interface circuit further includes a magnitude sensing circuit and an offset circuit. The magnitude sensing circuit includes a switching device that is operable between an on and an off state. The switching device will turn on when the magnitude of the ignition pulses exceeds a predetermined upper limit. When the switching device in the magnitude sensing circuit is turned on, the magnitude sensing circuit will activate the offset circuit.

The offset circuit also includes a switching device which is operable between an on and an off state. The switching device of the offset circuit will turn on upon being activated by the magnitude sensing circuit. When the switching device of the offset circuit is turned on, a resistor is inserted into the conditioning circuit to reduce the magnitude of the ignition pulses being received by the conditioning circuit. By reducing the magnitude of the ignition pulses being received by the conditioning circuit, the amount of power seen by the conditioning circuit will be reduced. Thus, the conditioning circuit is protected against high voltage ignition pulses. In this manner, the tachometer interface circuit of the invention can be used with a variety of internal combustion engines having ignition pulses which vary in magnitude. Additionally, the tachometer interface circuit of the invention can remain connected to the measuring device regardless of the type of engine being analyzed.

It is, therefore, an object of the invention to provide a tachometer interface circuit that can be used with a conventional multi-functional measuring device such that the measuring device can be used to determine the engine speed of a variety of types of internal combustion engines. Particularly, it is an object of the invention to provide a tachometer interface circuit which allows a measuring device to be used with a variety of types of marine propulsion systems.

Other objects and features of the invention will become apparent in the following description and claims.

BRIEF DESCRIPTION OF THE SEVERAL VIEWS OF THE DRAWINGS

The drawings illustrate the best mode presently contemplated of carrying out the invention.

In the drawings.

DETAILED DESCRIPTION OF THE INVENTION

Figure 1:
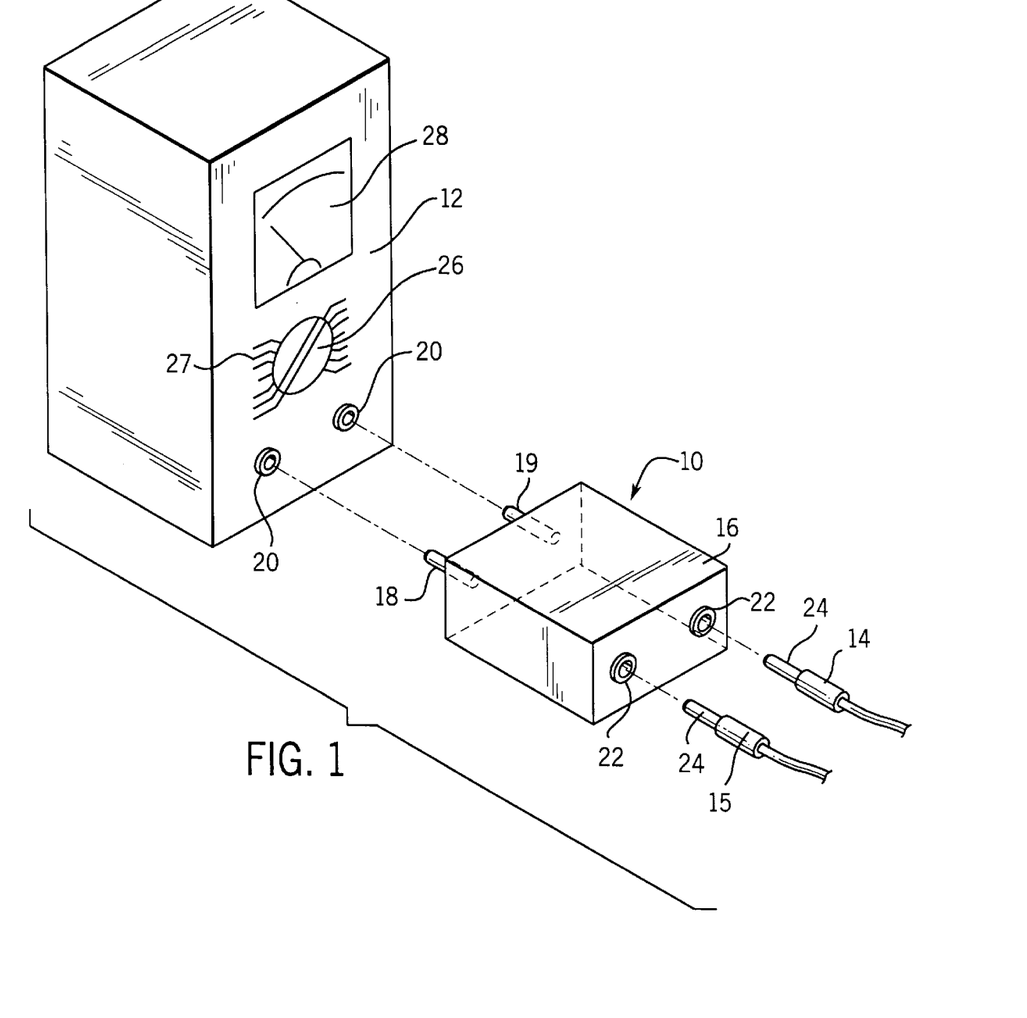
FIG. 1 is a perspective view of the tachometer interface circuit of the present invention as positioned between a measuring device and an internal combustion engine.

Referring first to FIG. 1, thereshown is a tachometer interface circuit of the invention, generally referred to by reference numeral 10. As can be understood in FIG. 1, the tachometer interface circuit 10 is constructed to be positioned between a multi-functional measuring device 12 and leads 14 and 15. Leads 14 and 15 are connected to an internal combustion engine (not shown) that is being tested. The tachometer interface circuit 10 is enclosed in an outer housing 16 which provides protection for the internal circuitry to be described below. The housing 16 can be of a variety of forms and shapes as long as it is large enough to enclose the internal circuitry. In the preferred embodiment of the invention, the housing 16 is constructed from a durable plastic. The housing 16 includes a pair of posts 18 and 19 that extend from the housing 16 to provide the electrical connection between the tachometer interface circuit 10 and the measuring device 12. The posts 18 and 19 are received by a pair of receptacles 20 formed on the front face surface of the measuring device 12. The posts 18 and 19 are of the correct size and are aligned properly such that they are received in the receptacles 20 as can be understood in FIG. 1.

The housing 16 of the tachometer interface circuit 10 includes a pair of receptacles 22 formed on the opposite end of the housing 16 from the posts 18 and 19. The receptacles 22 receive the posts 24 contained on the leads 14 and 15 such that the tachometer interface circuit 10 is electrically positioned between the leads 14 and 15 and the measuring device 12. When the measuring device 12 is used without the tachometer interface circuit 10, the leads 14 and 15 are directly inserted into the receptacles 20 on the face surface of the measuring device 12.

The multi-functional measuring device 12 is commonly available and is used to measure various operating conditions of an internal combustion engine. In a preferred embodiment, the measuring device 12 is a MultiMate™ meter, Part No. MT586A, sold by Snap-On. The measuring device 12 is useful in measuring a variety of engine operating parameters. For example, measuring device 12 could be used to measure voltages at different points in the engine, the resistance of certain components of the engine, current flowing through various areas of the engine, and the engine speed, among other things.

The measuring device 12 includes a rotary dial 26 that is used to select the operating mode of the measuring device 12. The rotary dial 26 can be moved to a variety of positions as indicated by the indicator lines 27 printed on the front face surface of the measuring device 12. In the embodiment shown in FIG. 1, the rotary dial 26 is positioned such that the measuring device 12 emulates a tachometer that is able to measure the engine speed of the internal combustion engine to which the measuring device 12 is connected. The measuring device 12 further includes a display 28 that visually displays the engine operating characteristic currently being measured by the measuring device 12. In the embodiment shown in FIG. 1, the display 28 includes a needle that moves based on the value of the component being measured. In an equivalent measuring device, the display 28 could include a digital display panel.

The measuring device 12 includes complex internal circuitry that is able to make a variety of measurements related to an internal combustion engine. As the rotary dial 26 is moved between its possible positions, the signal entering through the receptacles 20 is coupled to one of the internal circuits contained in the measuring device 12. When the multi-functional measuring device 12 is selected to emulate a tachometer, the electrical signal coming through the receptacles 20 is connected to a circuit which is configured to receive ignition pulses from an automotive engine. The ignition system in an automobile is typically an inductive system, such that the measuring device 12 is configured to receive signals from an inductive ignition system.

In marine propulsion systems, however, many of the ignition systems are capacitive discharge ignition systems. Thus, the internal circuitry contained in the measuring device 12 is configured improperly for a capacitive discharge ignition system. As a result, the measuring device 12 shown in FIG. 1 is unable to act as a tachometer for an internal combustion engine having a capacitive discharge ignition system. In addition, the ignition system in a marine propulsion system generates ignition pulses that contain a considerable amount of noise when compared to ignition pulses in an automotive system. The addition of noise to the ignition pulses increases the difficulty in measuring the engine speed for the measuring device 12.

In order to allow the commercially available measuring device 12 to be used on an internal combustion engine used in the marine industry, the tachometer interface circuit 10 has been developed and is positioned between the measuring device 12 and the leads 14 and 15. The tachometer interface circuit 10 conditions the ignition pulses coming from the ignition system of an internal combustion engine such that the measuring device 12 can operate properly as a tachometer. Additionally, the tachometer interface circuit 10 is configured such that it can remain in place when the measuring device 12 is being used on an automotive internal combustion engine. In this manner, the tachometer interface circuit 10 allows the conventional measuring device 12 to be used with a variety of engine types, such as those used in both the automotive and marine industries.

Figure 2:
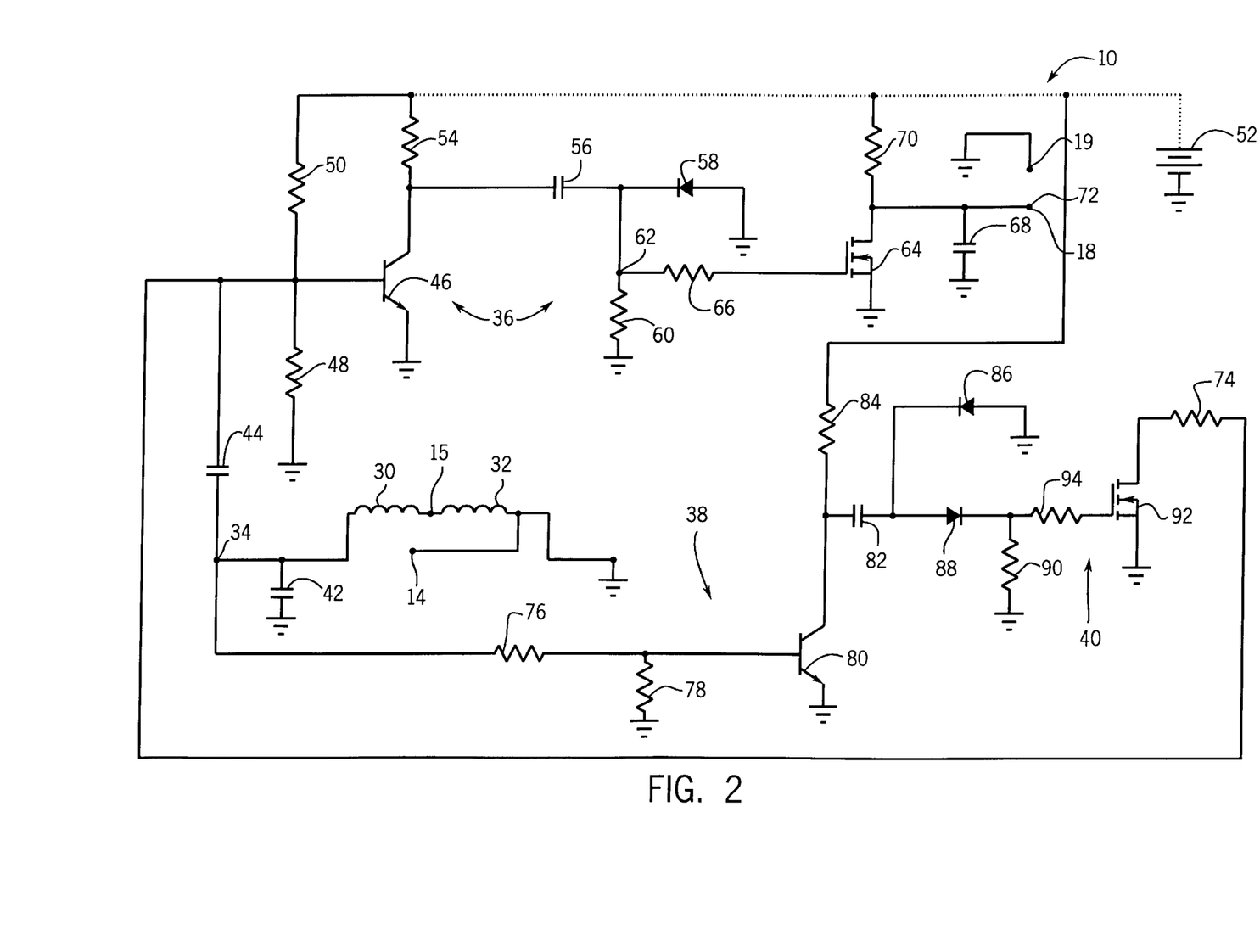
FIG. 2 is a detailed circuit diagram of the tachometer interface circuit of the present invention.

Referring now to FIG. 2, the detailed circuit diagram of the tachometer interface circuit 10 of the present invention is thereshown. The tachometer interface circuit 10 is connected to the pickup leads 14 and 15 such that the ignition pulses from the internal combustion engine are coupled to the remaining components of the tachometer interface circuit 10. The leads 14 and 15 include a pair of center tap inductors 30 and 32 as is well known in the art. One end of the inductor pair 30, 32 is connected to ground, while the second end is fed into the remaining portion of the tachometer interface circuit 10. The ignition pulses from the internal combustion engine are thus present at node 34.

Node 34 is connected to both a conditioning circuit 36 and a magnitude sensing circuit 38. Along with the conditioning circuit 36 and the magnitude sensing circuit 38, the tachometer interface circuit 10 also includes an offset circuit 40.

Capacitor 42 is connected between node 34 and ground to help eliminate some of the noise present in the ignition pulses from the internal combustion engine. Capacitor 42 is particularly useful when the magnitude of the ignition pulses is relatively small, since the effect of noise on such a signal has a greater impact. For example, the peak-to-peak voltage of the ignition pulses entering the tachometer interface circuit 10 can be in the range of 500 millivolts to 20 volts. When the tachometer interface circuit 10 is connected to an ignition system having ignition pulses with a peak-to-peak voltage around 500 millivolts, the elimination of noise becomes an important consideration.

Typically, the leads 14 and 15 are inductively connected to the secondary lead to the spark plugs in the internal combustion engine, such that the speed of the engine can be determined by the frequency of the ignition pulses sent to the spark plugs. The ignition pulses present at node 34 are fed through a coupling capacitor 44 to the base of transistor 46 of the conditioning circuit 36. In a typical ignition system used in a marine propulsion system, the ignition pulses sent to the spark plugs are relatively messy and include voltage spikes which makes determining the frequency of the ignition pulses relatively difficult. For this reason, the conditioning circuit 36 is used to "clean up" the ignition pulses and provide a series of output pulses, each of which have a constant pulse width. In this manner, the series of output pulses from the tachometer interface circuit 10 can be more easily read and monitored by the measuring device 12.

When an ignition pulse is present at node 34, the voltage value of the pulse is applied to the base of the transistor 46. Transistor 46 will turn on when a 0.7 volt differential is present between the base and the emitter. Since the ignition pulses may have a magnitude as low as 500 millivolts, a voltage divider including resistors 48 and 50 is connected between a power supply 52 and the base of transistor 46 to apply a bias voltage to the base of transistor 46. In the preferred embodiment of the invention, the resistors 48 and 50 are selected such that a bias voltage of approximately 0.4 volts is applied to the base of transistor 46. As a result of the 0.4 volt bias voltage, the transistor 46 will turn on when the voltage at node 34 exceeds approximately 0.3 volts. Therefore, when an ignition pulse having a peak-to-peak voltage of 500 millivolts is present, the pulse will be sufficient to turn on the transistor 46.

Before an ignition pulse is applied to the base of transistor 46 to turn the transistor 46 on, capacitor 56 is charged to approximately the voltage of power supply 52 through a resistor 54. As can be understood in FIG. 2, the capacitor 56 will be charged such that its leftmost side is positive relative to the rightmost side. When the transistor 46 is turned on by an ignition pulse present at its base, the transistor 46 provides a path to ground for the leftmost, positive side of capacitor 56. Since the leftmost, positive side of the transistor 56 will now be at ground potential, capacitor 56 will discharge through diode 58. Since capacitor 56 is connected directly to ground through diode 58, the capacitor 56 is able to discharge very rapidly. Diode 58 is biased as shown such that the capacitor 56 can only discharge to ground when the transistor 46 is turned on.

Once the ignition pulse at the base of transistor 46 dissipates, transistor 46 again turns off. When transistor 46 is off, the capacitor 56 begins to recharge through resistor 54 and resistor 60. While the capacitor 56 is being charged, current from the power supply 52 flows through resistor 54, capacitor 56, and resistor 60. The flow of current through resistor 60 creates a voltage at node 62 which is connected to the gate of transistor 64 through a current limiting resistor 66. The current limiting resistor 66 is connected between node 62 and the gate of transistor 64 to remove very high frequency energy that is being picked up by the leads 14 to prevent the high frequency energy from damaging the gate of transistor 64.

Transistor 64 is a field effect transistor that requires a threshold voltage of approximately a 2–3 volts to turn on. Thus, as capacitor 56 is charging, current from the power supply 52 is flowing through resistor 60, which creates a voltage at the gate of transistor 64 large enough to turn transistor 64 on. Before transistor 64 is turned on, capacitor 68 is charged to the power supply voltage through resistor 70, such that the output signal from the tachometer interface circuit 10 present between node 72 and ground is approximately the power supply voltage. When the transistor 64 is turned on, capacitor 68 quickly discharges through the transistor 64, such that the output signal present at node 72 goes to ground potential. The output signal from node 72 of the tachometer interface circuit 10 is fed into the measuring device 12 through the posts 18 and 19.

The duration of time during which the output signal at node 72 is at ground potential is determined by the amount of time required to charge capacitor 56, since during the recharging of capacitor 56, a current flows through resistor 60 which generates the required voltage to turn on transistor 64. In the preferred embodiment of the invention, the capacitor 56 is selected such that it requires approximately 2 milliseconds to charge, thereby creating an output pulse at node 72 having a pulse width of approximately 2 milliseconds.

When the capacitor 56 is fully recharged to the power supply voltage, current no longer flows through resistor 60, thereby removing the threshold voltage and thus turning off transistor 64. After transistor 64 has been turned off, the voltage from the power supply 52 recharges the capacitor 68 and returns the output signal at node 72 to a high value.

When the next ignition pulse arrives at node 34, transistor 46 will again be turned on, resulting in the nearly instantaneous discharge of capacitor 56 through diode 58 as previously described. Once the ignition pulse has dissipated, the capacitor 56 will begin to recharge and thus turn on transistor 64, thereby resulting in low-valve output pulse at node 72. In this manner, the ignition pulses from the engine, which are noisy and of variable duration, are conditioned by the conditioning circuit 36. The conditioning circuit 36 generates a series of output pulses each of which has a constant duration. In this manner, the tachometer interface circuit 10 is able to condition the series of ignition pulses from the engine and generate a readable series of output pulses having the same frequency as the ignition pulses.

Although the conditioning circuit 36 previously described is effective in converting the ignition pulses into a series of output pulses having a constant pulse width and a frequency corresponding to the ignition pulses, the conditioning circuit 36 alone cannot be used on the wide variety of internal combustion engines used in the marine propulsion industry. Since the internal combustion engines used in the marine industry are widely varied, the ignition pulses range in magnitude between 500 millivolts and 20 volts peak-to-peak. Ignition pulses near the upper limit of 20 volts can overload and damage the transistor 46, since the transistor 46 is configured to turn on when the ignition pulses exceed 300 mv. Therefore, the magnitude sensing circuit 38 and the offset circuit 40 are connected between node 34 and the input to the base of the transistor 46 in the conditioning circuit 36. In short, the magnitude sensing circuit 38 and the offset circuit 40 combine to sense the magnitude of the ignition pulses and insert a resistor 74 in parallel with resistor 48 when the magnitude of the ignition pulses exceeds a predetermined upper limit. Thus, when the magnitude of the ignition pulses exceeds this predetermined upper limit, the parallel resistors 74 and 48 reduce the magnitude of the ignition pulses before the ignition pulses are fed into the base of transistor 46.

Initially, the ignition pulses present at node 34 are fed through a voltage divider including resistors 76 and 78. The voltage across resistor 78 is coupled to a switching device, such a transistor 80. Transistor 80 will turn on when the voltage at the base exceeds the voltage at the emitter by 0.7 volts. Since the magnitude of the ignition pulses at node 34 is reduced by the voltage divider including resistor 76 and 78, the selection of resistors 76 and 78 determines the magnitude of voltage required at node 34 to turn on transistor 80. In the preferred embodiment of the invention, the resistors 76 and 78 are selected such that transistor 80 will turn on when the magnitude of the ignition pulses at node 34 exceeds approximately 2 volts.

Before the transistor 80 is turned on by an ignition pulse of sufficient magnitude, capacitor 82 is charged to the power supply voltage through resistor 84. When the capacitor 82 is fully charged, the leftmost side of capacitor 82 will be positive relative to the rightmost side.

When the magnitude of an ignition pulse at node 34 exceeds the predetermined upper limit (2 volts in the preferred embodiment) the transistor 80 will turn on, thereby effectively grounding the leftmost side of capacitor 82. Since the leftmost side of capacitor 82 is now at ground potential, capacitor 82 will quickly discharge through diode 86. Diode 86 is biased as shown in FIG. 2 such that the capacitor 82 can only discharge when transistor 80 is on.

Once the ignition pulse has dissipated at node 34, the transistor 80 will again turn off. After the transistor 80 has turned off, capacitor 82 will begin to recharge through resistor 84, diode 88, and resistor 90. As the capacitor 82 begins to charge, current will flow through resistor 84, capacitor 82, diode 88 and resistor 90 until the capacitor 82 has been fully charged to the power supply voltage. As capacitor 82 charges, the current flowing through resistor 90 will create a voltage that is applied through a current limiting resistor 94 to the gate of transistor 92. The current limiting resistor 94 connected to the gate of transistor 92 protects the gate of transistor 92 from high frequency signals. In the same manner as discussed with transistor 64, transistor 92 is a field effect transistor that will turn on when the voltage at the gate is above a threshold voltage of approximately 2–3 volts. When the transistor 92 is turned on, resistor 74 is effectively connected to ground, such that resistor 74 is placed in parallel with resistor 48.

During the period of time that the capacitor 82 is charging and transistor 92 is on, the internal capacitance inherently present in the field effect transistor 92 is being charged. When the capacitor 82 has been fully charged, current will no longer be flowing through resistor 90, which would normally turn off the transistor 92. However, since transistor 92 includes internal capacitance, the voltage stored in the internal capacitance of transistor 92 will begin to be discharged through resistor 94 and resistor 90. This discharge of the internal capacitance of transistor 92 creates a voltage differential between the gate and source of transistor 92, thereby keeping the transistor 92 on for a period of time. In the embodiment of the invention shown, the transistor 92 will remain on for a period of time which is greater than the period of time between successive ignition pulses. Thus, as long as the magnitude of the ignition pulses exceeds the predetermined upper limit, the transistor 92 will keep resistor 74 in parallel with resistor 48 during the period of time between successive ignition pulses.

As discussed, when the transistor 92 is on, the resistor 74 is placed in parallel with resistor 48. Thus, when the magnitude of the ignition pulses exceed the upper limit, the parallel combination of resistors 48 and 74 reduces the voltage magnitude of the ignition pulses present at the base of transistor 46. In the preferred embodiment of the invention, the resistor 48 is 75 kΩ while the resistor 74 is 1.5 kΩ, such that the parallel combination lowers the resistance seen by the base of transistor 46 from 75 kΩ to approximately 1.47 kΩ.

Figure 3A:
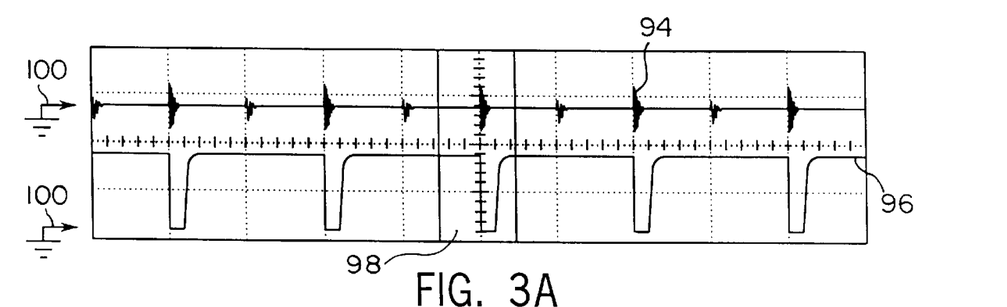
FIG. 3A is a graph illustrating the input signal to the tachometer interface circuit having a first magnitude and the output signal from the tachometer interface circuit.

Referring now to FIGS. 3A–8B, thereshown are various graphs of electric signal values at different locations in the tachometer interface circuit 10. Referring first to FIGS. 3A and 3B, thereshown is a series of ignition pulses 94 present at node 34 and the output signal 96 which is present at node 72 and fed into the measuring device 12. FIG. 3B is a magnified view of the portion of FIG. 3A between the solid lines, as indicated at reference numeral 98. The time axis in FIG. 3B is expanded to 1 millisecond per division, whereas the time axis in FIG. 3A is 10 milliseconds per division. Thus, FIG. 3B more clearly shows the details of the ignition pulse 94 and the output pulse width.

Figure 3B:
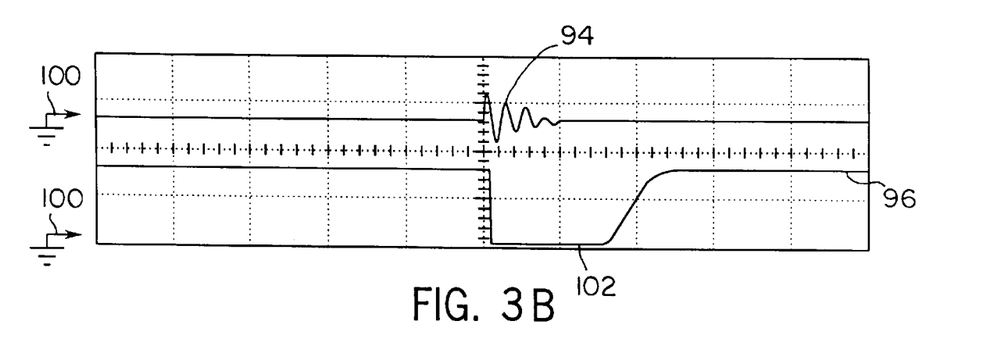
FIG. 3B is an exploded view of a portion of the input and output signals of FIG. 3A.

In FIGS. 3A and 3B, each of the ignition pulses 94 has a magnitude of approximately 500 millivolts peak-to-peak. Before an ignition pulse 94 is present at node 34, the output signal 96 is at a high value well above the ground potential 100. The ground potential 100 is shown by a reference arrow at the left of each of the FIGS. 3A–8B. The high value of the output signal 96 generally corresponds to the power supply voltage 52.

As previously discussed, when an ignition pulse 94 is present at node 34, transistor 46 is turned on, causing capacitor 56 to discharge. Once the magnitude of ignition pulse 94 drops below the voltage required to turn on transistor 46, capacitor 56 begins to recharge. As the capacitor 56 begins to charge, the current flowing through resistor 60 causes transistor 64 to turn on. As transistor 64 turns on, the output node 72 is essentially grounded, which corresponds to the low level 102 of the output signal 96 shown in FIG. 3B. The output signal 96 at node 72 remains low for the period of time required to recharge capacitor 56. In the preferred embodiment of the invention, this recharge time is approximately 2 milliseconds, as can be understood clearly in FIG. 3B. Each time an ignition pulse 94 is present at node 34, the output signal 96 drops to the low level 102 for a constant period of time. Thus, the output signal 96 has a frequency corresponding to the frequency of the series of ignition pulses 94 from the internal combustion engine and can easily be interpreted by the measuring device 12 to determine the engine speed.

Figure 6A:
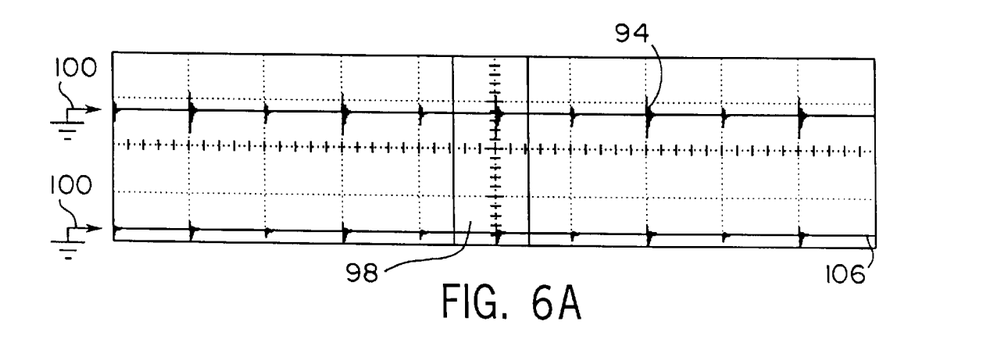
FIG. 6A is a graph illustrating the input signal of FIG. 3A and the drain voltage for the switching device in the tachometer interface circuit.
Figure 6B:
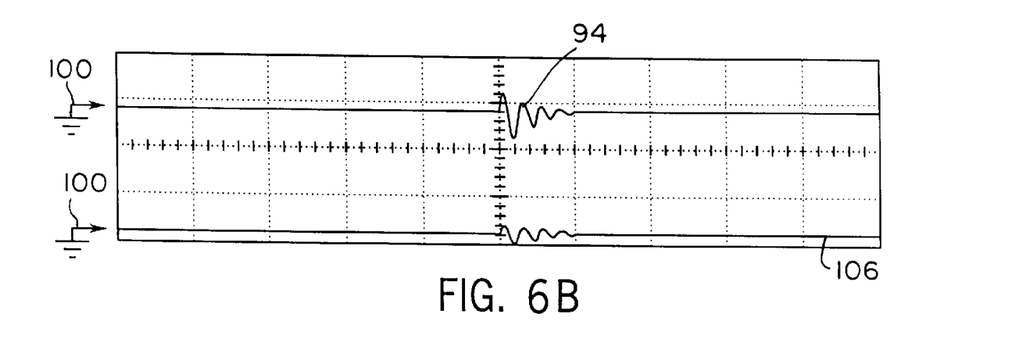
FIG. 6B is an exploded view of a portion of the input signal and drain voltage of FIG. 6A.

Referring now to FIGS. 5A–6B, thereshown is the voltage at the gate of transistor 92, as indicated by reference numeral 104, and the voltage at the drain of transistor 92, as indicated by reference numeral 106. FIGS. 5B and 6B are similar to FIGS. 5A and 6A, except that FIGS. 5B and 6B are exploded views of the area shown by reference numeral 98. As previously discussed, when a ignition pulse 94, having a magnitude of approximately 500 millivolts, is present at node 34, this voltage value is insufficient to turn on transistor 80. Since transistor 80 is off, transistor 92 is also off, such that resistor 94 is not in parallel with resistor 48. This can be clearly seen in FIGS. 5B and 6B, which show that the voltage 104 at the gate of transistor 92 and the voltage 106 at the drain of transistor 92 are each at ground potential before, during and after the ignition pulse 94. Therefore, when the magnitude of the ignition pulse 94 is below the preselected upper limit (2 volts), the resistor 74 is not inserted in parallel with resistor 48. Without resistor 74 inserted into the conditioning circuit 36, a relatively low magnitude of the ignition pulse 94 at node 34 will turn on transistor 46 in the manner previously discussed.

Figure 4A:
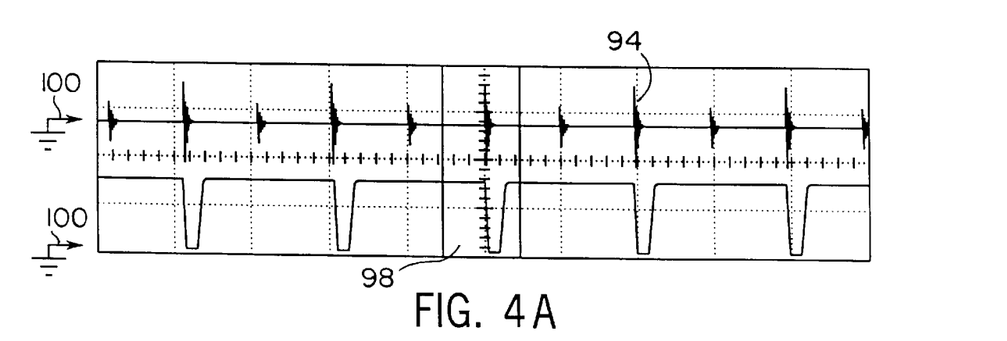
FIG. 4A is a graph similar to FIG. 3A for an input signal having a second magnitude.
Figure 4B:
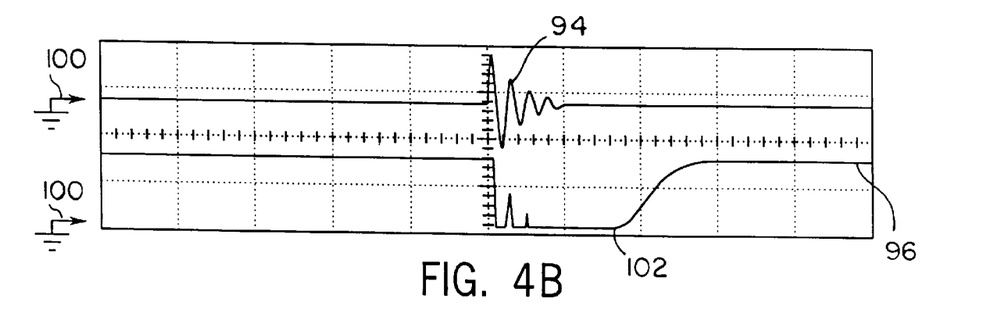
FIG. 4B is an exploded view of a portion of the input and output signals of FIG. 4A.
Figure 5A:
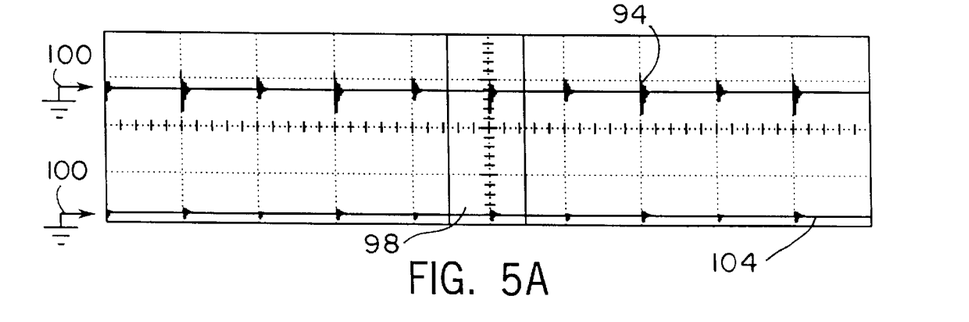
FIG. 5A is a graph illustrating the input signal of FIG. 3A and the gate voltage for a switching device in the tachometer interface circuit.
Figure 5B:
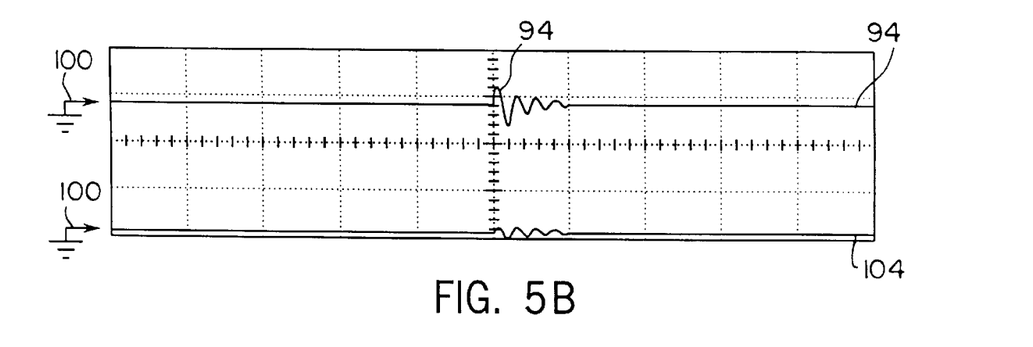
FIG. 5B is an exploded view of a portion of the input signal and gate voltage of FIG. 5A.

Referring now to FIGS. 4A and 4B, thereshown is a series of ignition pulses 94 having a peak to peak magnitude of approximately 4 volts. As before, FIG. 4B is a magnified version of area 98 in FIG. 4A. Referring to FIG. 4B, it is clear that once an ignition pulse 94 is present at node 34, the output signal 96 drops to the low level 102 in a similar manner to that discussed in regard to FIGS. 3A and 3B. Each of the low level pulses in the output signal 96 has a constant pulse width of approximately 2 milliseconds. Thus, the tachometer interface circuit 10 generates an output signal 96 having a series of pulses that each have a constant pulse width regardless of the peak-to-peak magnitude of the ignition pulses 94.

However, as previously discussed, when the peak-to-peak magnitude of the ignition pulses 94 exceeds the predetermined upper limit, the magnitude sensing circuit 38 and offset circuit 40 place resistor 74 in parallel with resistor 48 to reduce the load to the base of transistor 46. The operation of the magnitude sensing circuit 38 and offset circuit 40 can be most clearly seen in FIGS. 7A–8B. In these figures, the voltage 104 at the gate of transistor 92 and the voltage 106 at the drain of transistor 92 are shown. As was previously discussed, when an ignition pulse 94 is present at node 34 large enough to turn on transistor 80, capacitor 82 will discharge through diode 86. When the voltage at the base of transistor 80 falls below the level required to turn it on, the capacitor 82 will begin to recharge through resistor 84 and resistor 90. Current flowing through resistor 90 will turn on transistor 92 to place resistor 74 in parallel with resistor 48.

Figure 7A:
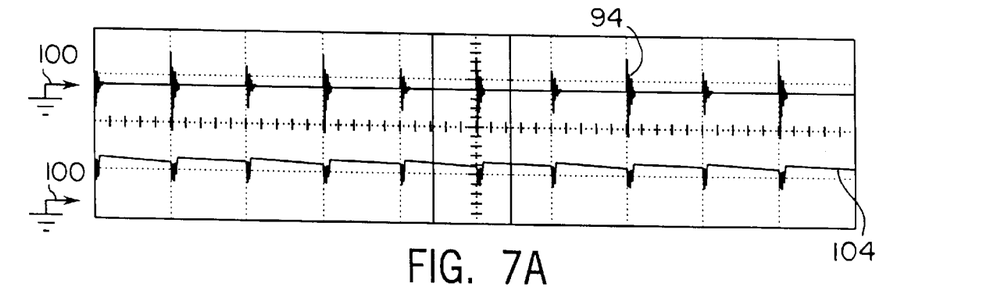
FIG. 7A is a graph illustrating the input voltage of FIG. 4A and the gate voltage for a switching device of the tachometer interface circuit.
Figure 7B:
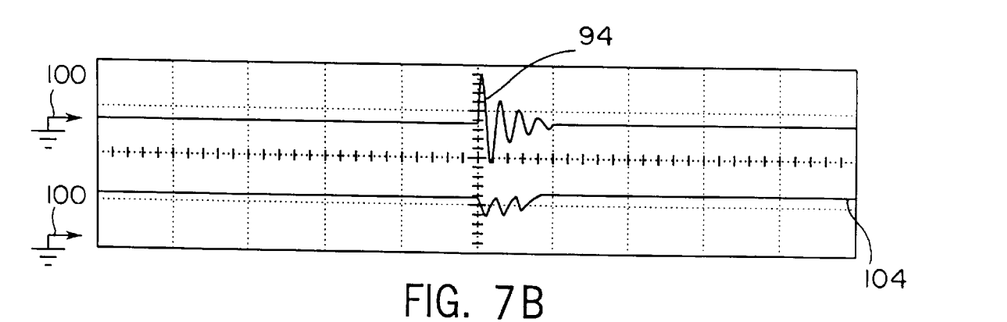
FIG. 7B is an exploded view of a portion of the input signal and gate voltage of FIG. 7A.

As can be seen in FIG. 7A, the voltage 104 at the gate of transistor 90 is well above ground potential 100 at all times, indicating that the transistor 92 will be on for the entire duration of the series of ignition pulses 94 having a magnitude of 4 volts. As discussed, because of the internal capacitance in transistor 92, the transistor 92 will remain on even during the period of time between successive ignition pulses 94. The effect of the internal capacitance of the transistor 92 can be clearly seen in FIG. 7A, since the transistor 92 remains on between successive ignition pulses 94.

Figure 8A:
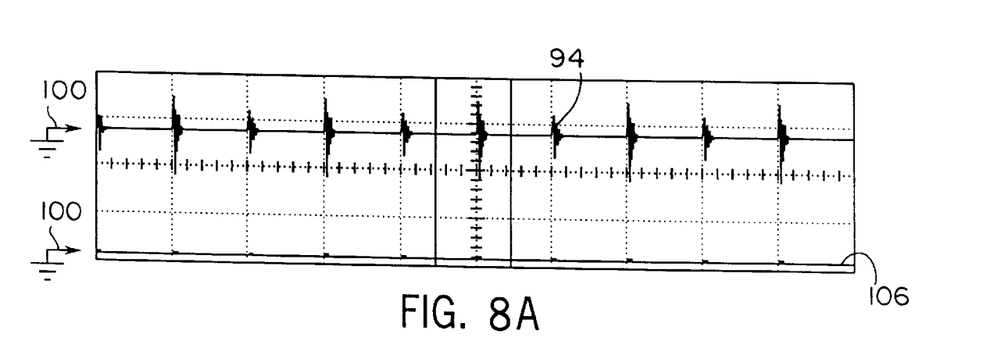
FIG. 8A is a graph illustrating the input signal of FIG. 4A and the drain voltage for a switching device of the tachometer interface circuit.
Figure 8B:
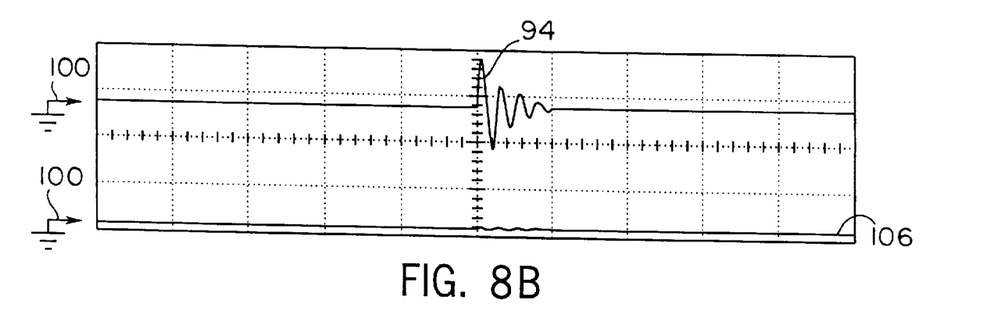
FIG. 8B is an exploded view of a portion of the input signal and drain voltage of FIG. 8A.

Referring to FIGS. 8A and 8B, it can be seen that when the ignition pulses 94 have a magnitude greater than the preselected upper limit are present at node 34, the drain voltage 106 is at ground potential, indicating that transistor 92 is on. When transistor 92 is on, the resistor 74 is effectively connected to ground, thereby placing it in parallel with resistor 48. Again, the effect of the internal capacitance of transistor 92 can be seen in FIG. 8A, since the transistor 92 remains on between successive ignition pulses 94. When resistor 74 and resistor 48 are in parallel, the magnitude of the ignition pulse 94 fed into the base of transistor 46 is decreased, thereby reducing the load applied to the transistor 46. In this manner, the tachometer interface circuit 10 can be used with ignition pulses having a large range of possible magnitudes. In a preferred embodiment of the invention, the tachometer interface circuit 10 has been shown to operate with the ignition input signals ranging between 500 millivolts and 20 volts peak-to-peak. However, by selecting the appropriate value of resistors 74, 48 and 50 the tachometer interface circuit 10 can be modified to be used for a variety of voltage ranges.

A significant advantage of the tachometer interface circuit 10 is that it can remain in place when the measuring device 12 is being used on a wide variety of internal combustion engines, including automotive engines, since the tachometer interface circuit 10 has the ability to condition the ignition pulses and reduce the voltage magnitude of the pulses automatically. It is also contemplated that the tachometer interface circuit could eventually be internally installed in the measuring device 12 and operate as previously described.

I claim:

1. A tachometer interface circuit for use with a measuring device and an internal combustion engine, comprising:

a conditioning circuit connectable to the engine, the conditioning circuit receiving a series of ignition pulses from the engine at a frequency corresponding to the engine speed, the conditioning circuit generating a series of conditioned output pulses to the measuring device, the output pulses having a frequency correlated to the frequency of the ignition pulses, each output pulse having a constant pulse width;

a magnitude sensing circuit connectable to the engine for sensing the magnitude of the ignition pulses from the engine; and an offset circuit coupled to the magnitude sensing circuit for reducing the magnitude of the ignition pulses received by the conditioning circuit upon being activated by the magnitude sensing circuit, wherein the magnitude sensing circuit includes a switching device operable between an activated and a deactivated state, wherein the magnitude sensing circuit activates the offset circuit when the switching device is activated.

2. The tachometer interface circuit of claim 1 wherein the switching device of the magnitude sensing circuit is activated when the magnitude of the ignition pulses from the engine exceed a preselected upper limit.

3. The tachometer interface circuit of claim 2 wherein the switching device in the magnitude sensing circuit is a transistor which is turned on when the magnitude of the ignition pulses from the engine exceed the predetermined upper limit.

4. A tachometer interface circuit for use with a measuring device and an internal combustion engine, comprising:

a conditioning circuit connectable to the engine, the conditioning circuit receiving a series of ignition pulses from the engine at a frequency corresponding to the engine speed, the conditioning circuit generating a series of conditioned output pulses to the measuring device, the output pulses having a frequency correlated to the frequency of the ignition pulses, each output pulse having a constant pulse width;

a magnitude sensing circuit connectable to the engine for sensing the magnitude of the ignition pulses from the engine; and an offset circuit coupled to the magnitude sensing circuit for reducing the magnitude of the ignition pulses received by the conditioning circuit upon being activated by the magnitude sensing circuit, wherein the offset circuit includes a switching device which is operable between an activated and a deactivated state, such that the offset circuit reduces the magnitude of the ignition pulses when the switching device is in the activated state.

5. The tachometer interface of claim 4 wherein the switching device enters the activated state upon being activated by the magnitude sensing circuit.

6. The tachometer interface circuit of claim 5 wherein the switching device has internal capacitance such that the switching device remains activated for a period of time after receiving the activation signal from the magnitude sensing circuit.

7. A tachometer interface circuit for use with a measuring device and an internal combustion engine, comprising:

a conditioning circuit connectable to the engine, the conditioning circuit receiving a series of ignition pulses from the engine at a frequency corresponding to the engine speed, the conditioning circuit generating a series of conditioned output pulses to the measuring device, the output pulses having a frequency correlated to the frequency of the ignition pulses, each output pulse having a constant pulse width;

a magnitude sensing circuit connectable to the engine for sensing the magnitude of the ignition pulses from the engine; and an offset circuit coupled to the magnitude sensing circuit for reducing the magnitude of the ignition pulses received by the conditioning circuit upon being activated by the magnitude sensing circuit, wherein the magnitude sensing circuit includes a voltage divider for controlling the activation of a switching device.

8. A tachometer interface circuit for use between a measuring device and an internal combustion engine, comprising:

a conditioning circuit connectable to the engine, the conditioning circuit receiving a series of ignition pulses from the engine, at a frequency corresponding to the engine speed, the conditioning circuit generating a series of conditioned output pulses to the measuring device, the output pulses having a frequency correlated to the frequency of the ignition pulses, each output pulse having a constant pulse width;

a magnitude sensing circuit connectable to the engine for sensing the magnitude of ignition pulses from the engine, the magnitude sensing circuit including a switching device operable between an activated and a deactivated state, wherein the switching device of the magnitude sensing circuit enters an activated state when the magnitude of the ignition pulses from the engine exceeds a preselected upper limit; and an offset circuit coupled to the magnitude sensing circuit for reducing the magnitude of the ignition pulses received by the conditioning circuit, the offset circuit including a switching device which is operable between an activated and a deactivated state, such that the offset circuit reduces the magnitude of the ignition pulses when the switching device is in the activated state, wherein the switching device of the offset circuit enters the activated state upon being activated by the magnitude sensing circuit, wherein the offset circuit includes a resistor that is inserted into the conditioning circuit when the switching device in the offset circuit is activated.

9. A tachometer interface circuit for use between a measuring device an internal combustion engine, comprising:

a conditioning circuit connectable to the engine, the conditioning circuit receiving a series of ignition pulses from the engine, at a frequency corresponding to the engine speed, the conditioning circuit generating a series of conditioned output pulses to the measuring device, the output pulses having a frequency correlated to the frequency of the ignition pulses, each output pulse having a constant pulse width;

a magnitude sensing circuit connectable to the engine for sensing the magnitude of ignition pulses from the engine, the magnitude sensing circuit including a switching device operable between an activated and a deactivated state, wherein the switching device of the magnitude sensing circuit enters an activated state when the magnitude of the ignition pulses from the engine exceeds a preselected upper limit; and an offset circuit coupled to the magnitude sensing circuit for reducing the magnitude of the ignition pulses received by the conditioning circuit, the offset circuit including a switching device which is operable between an activated and a deactivated state, such that the offset circuit reduces the magnitude of the ignition pulses when the switching device is in the activated state, wherein the switching device of the offset circuit enters the activated state upon being activated by the magnitude sensing circuit, wherein the switching device of the offset circuit includes a delay component, such that the switching device remains in the activated state for a period of time between successive ignition pulses.

10. A method of determining the engine speed of an internal combustion engine with a measuring device, the method comprising:

conditioning a series of ignition pulses received from the engine in a conditioning circuit connected to the engine;

generating a series of output pulses from the conditioning circuit, each of the output pulses having a constant pulse width, the series of output pulses corresponding in frequency to the series of ignition pulses;

sensing the magnitude of the ignition pulses from the engine;

reducing the magnitude of the ignition pulses received by the conditioning circuit when the magnitude of the ignition pulses exceeds an upper limit; and providing the series of output pulses to the measuring device such that the engine speed can be displayed on the measuring device, wherein the magnitude of the ignition pulses is reduced by selectively inserting a resistor into the conditioning circuit.

11. A method of determining the engine speed of an internal combustion engine with a measuring device, the method comprising:

conditioning a series of ignition pulses received from the engine in a conditioning circuit connected to the engine;

generating a series of output pulses from the conditioning circuit, each of the output pulses having a constant pulse width, the series of output pulses corresponding in frequency to the series of ignition pulses;

sensing the magnitude of the ignition pulses from the engine;

reducing the magnitude of the ignition pulses received by the conditioning circuit when the magnitude of the ignition pulses exceeds an upper limit;

providing the series of output pulses to the measuring device such that the engine speed can be displayed on the measuring device;

activating a first switching device when the magnitude of one of the ignition pulses exceeds the upper limit;

deactivating the first switching device when one of the ignition pulses is not present at the first switching device; and activating a second switching device after the first switching device has been deactivated to insert a resistor into the conditioning circuit.

12. The method of claim 11 further comprising the step of providing a delay after deactivation of the first switching device, such that the second switching device remains activated between successive ignition pulses.

* * * * *